United States Patent
Sanders

(10) Patent No.: US 6,663,986 B2
(45) Date of Patent: Dec. 16, 2003

(54) MAGNETO-RESISTIVE STRIPE ELEMENT HAVING A THIN FILM CONDUCTOR COVERED BY A CONDUCTIVE CAPPING LAYER

(75) Inventor: Steven Castle Sanders, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 56 days.

(21) Appl. No.: 10/034,007

(22) Filed: Dec. 27, 2001

(65) Prior Publication Data

US 2003/0124384 A1 Jul. 3, 2003

(51) Int. Cl.[7] .................................................. G11B 5/39
(52) U.S. Cl. ...................... 428/692; 428/615; 428/663; 428/666; 428/661; 360/322; 360/327.22
(58) Field of Search ................................ 428/692, 615, 428/663, 666, 661; 360/322, 327.22

(56) References Cited

U.S. PATENT DOCUMENTS

| | | | |
|---|---|---|---|
| 5,258,884 A | * 11/1993 | Howard et al. | ........ 360/327.22 |
| 5,432,645 A | 7/1995 | Terunuma et al. | |
| 5,491,600 A | 2/1996 | Chen et al. | |
| 5,573,809 A | 11/1996 | Nix et al. | |
| 5,739,988 A | * 4/1998 | Gill | ........................ 360/324.12 |
| 5,790,351 A | 8/1998 | Suzuki | |
| 6,033,792 A | 3/2000 | Kirino et al. | |
| 6,139,906 A | 10/2000 | Hegde et al. | |
| 6,172,859 B1 | 1/2001 | Watanabe et al. | |
| 6,201,669 B1 | 3/2001 | Kakihara | |
| 6,219,207 B1 | 4/2001 | Pinarbasi | |

* cited by examiner

Primary Examiner—Deborah Jones
Assistant Examiner—Vivek Koppikar
(74) Attorney, Agent, or Firm—Brooks Kushman P.C.

(57) ABSTRACT

A magneto-resistive (MR) stripe element includes a magnetically active body portion and a tri-layer electrical conductor structure arranged proximate the magnetically active body portion. The conductor structure has an alpha-Ta bi-layer film and a chromium capping layer. The alpha-Ta bi-layer film includes a chromium base layer and a tantalum layer. The capping layer caps the alpha-Ta bi-layer film such that the tantalum layer is disposed between the chromium base layer and the chromium capping layer. The tri-layer conductor structure has minimized compressive stress after deposition of the three layers and an even lower compressive stress after annealing. The thickness of the chromium capping layer is dependent at least upon the thickness of the chromium base layer such that the tri-layer conductor has a minimized compressive stress after deposition and annealing. The MR stripe element may be incorporated in a magnetic read head for reading data from a magnetic storage medium.

13 Claims, 2 Drawing Sheets

MAGNETO-RESISTIVE STRIPE ELEMENT HAVING A THIN FILM CONDUCTOR COVERED BY A CONDUCTIVE CAPPING LAYER

BACKGROUND OF THE INVENTION

1. Field of the Invention

The present invention relates generally to magneto-resistive (MR) stripe elements for use in magnetic read heads and, more particularly, to an MR stripe element having a thin film electrical conductor covered by an electrically conductive capping layer which form a combined structure having a minimized compressive stress.

2. Background Art

Magnetic read heads include magneto-resistive (MR) stripe elements for reading data from a storage medium such as tape. In general, MR stripe elements sense magnetic flux from a magnetic storage medium to read data stored on the magnetic storage medium. MR stripe elements incur a change in resistivity in the presence of a magnetic field. A typical magnetically active MR material used for an MR stripe element is the alloy of nickel (Ni) and iron (Fe) with a 4:1 Ni—Fe ratio, i.e., permalloy.

In one embodiment, the entire area of an MR stripe element is entirely composed of an Ni—Fe film material. A problem with the entire area of an MR stripe element being entirely composed of an Ni—Fe film material is that Ni—Fe film material is present in inactive areas of the MR stripe element. A further problem with the entire area of an MR stripe element being entirely composed of an Ni—Fe film material is that Ni—Fe film material present in active areas influences the passive resistance, magnetic track width, Barkhausen noise, and other important read head performance properties.

Accordingly, an improved MR stripe element design has the Ni—Fe film material in the inactive areas removed. The improved MR stripe element further replaces the Ni—Fe film material present in the active areas with a thin film electrical conductor. In such case, the thin film conductor defines the magnetic track width and reduces the passive resistance. A relatively small number of thin film electrical conductor materials are suitable for exposure between the read head/tape interface. Such factors for determining which thin film electrical conductor materials are suitable include resistivity, wear, corrosion, stress/delamination, and cost. For example, thin film electrical conductor materials such as copper and gold are not suitable because they are soft and have a tendency to smear. Other thin film electrical conductor materials such as rhodium are prohibitively expensive.

A thin film electrical conductor material which does meet the suitability factors is alpha-tantalum (alpha-Ta). Alpha-Ta is a low resistivity phase of Ta formed by a structure having a chromium (Cr) base layer formed adjacent to a Ta layer. An alpha-Ta thin film conductor is a bi-layer structure having two distinct layers (a Cr base layer and a Ta layer) and is not a mixture. During fabrication of an MR stripe element, the Cr base layer is deposited prior to deposition of the Ta layer. Subsequently, the Ta layer is deposited on the Cr base layer. The Cr base layer influences the micro-structure of the subsequently deposited Ta layer.

It has been demonstrated that the alpha-Ta (Cr/Ta) bi-layer thin film conductor has a desired resistivity when the two layers are deposited by using ion beam deposition. However, it has also been demonstrated that the compressive stress of the alpha-Ta bi-layer thin film conductor after deposition is relatively high. Because of the high compressive stress, there are concerns with respect to the ability of the alpha-Ta bi-layer thin film conductor to adhere to the rest of the film stack of an MR stripe element. It has been further demonstrated that the compressive stress of the alpha-Ta bi-layer thin film conductor increases when exposed to a subsequent anneal which simulates the further processing steps that a read head having an MR stripe element may experience during fabrication.

In contrast to the demonstrations, it would be desirable if the compressive stress of the alpha-Ta bi-layer thin film conductor were effectively lowered after deposition of the two layers (Cr/Ta) as well as after exposure to an annealing.

SUMMARY OF THE INVENTION

Accordingly, it is an object of the present invention to provide a magneto-resistive (MR) stripe element having a thin film electrical conductor covered by an electrically conductive capping layer in order to form a combined structure having a minimized compressive stress.

It is another object of the present invention to provide an MR stripe element having inactive areas of an Ni—Fe magnetic film material removed and active areas of the Ni—Fe magnetic film material replaced with a combined structure formed by a thin film electrical conductor covered by an electrically conductive capping layer.

It is a further object of the present invention to provide an MR stripe element having an alpha-tantalum (chromium/tantalum; Cr/Ta) bi-layer thin film covered by an electrically conductive capping layer in order to form a combined alpha-Ta/capping tri-layer structure having a minimized compressive stress.

It is still another object of the present invention to provide an MR stripe element having an alpha-Ta bi-layer thin film covered by a Cr capping layer in order to form a combined alpha-Ta/Cr tri-layer structure having a minimized compressive stress.

It is still a further object of the present invention to provide an MR stripe element having an alpha-Ta bi-layer thin film covered by a Cr capping layer having a thickness dependent upon at least the thickness of the Cr base layer of the alpha-Ta bi-layer thin film in order to form a combined alpha-Ta/Cr tri-layer structure having a minimized compressive stress.

It is still yet another object of the present invention to provide an MR stripe element having an alpha-Ta bi-layer thin film covered by a Cr capping layer in order to form a combined alpha-Ta/Cr tri-layer structure having a minimized compressive stress after deposition of the alpha-Ta bi-layer thin film and the Cr capping layer.

It is still yet a further object of the present invention to provide an MR stripe element having an alpha-Ta bi-layer thin film covered by a Cr capping layer in order to form a combined alpha-Ta/Cr tri-layer structure having a minimized compressive stress after the combined structure undergoes annealing.

In carrying out the above objects and other objects, the present invention provides a magneto-resistive (MR) stripe element and a read head having the MR stripe element. The MR stripe element includes a magnetically active body portion and an electrical conductor structure arranged proximate the magnetically active body portion. The electrical conductor structure includes an alpha-Ta bi-layer film and an electrically conductive capping layer. The alpha-Ta bi-layer film includes a chromium base layer and a tantalum body layer. The electrically conductive capping layer caps the alpha-Ta bi-layer film such that the tantalum body layer is disposed between the chromium base layer and the electrically conductive capping layer.

The electrically conducting capping layer may be a chromium capping layer, a titanium capping layer, or a tungsten capping layer. The chromium base layer has a minimum thickness. The electrically conductive capping layer has a thickness dependent upon at least the thickness of the chromium base layer.

Further, in carrying out the above objects and other objects, the present invention provides a method of fabricating the MR stripe element. The method includes depositing an alpha-Ta bi-layer film proximate a magnetically active body portion by initially depositing a chromium base layer and then depositing a tantalum body layer on the chromium base layer. The method further includes depositing an electrically conductive capping layer on the alpha-Ta bi-layer film to cap the alpha-Ta bi-layer film such that the tantalum body layer is disposed between the chromium base layer and the electrically conductive capping layer. Preferably, the electrically conductive capping layer is a chromium capping layer. Preferably, the depositing steps include using ion beam deposition or sputtering.

Also, in carrying out the above objects and other objects, the present invention provides an MR stripe element having a magnetically active body portion and an electrical conductor structure arranged proximate the magnetically active body portion. The electrical conductor structure has a body capped by a capping layer. The capping layer has a lower compressive stress than the body such that the electrical conductor structure has a lower compressive stress than the compressive stress of the body.

The above objects and other objects, features, and advantages of the present invention are readily apparent from the following detailed description when taken in connection with the accompanying drawings.

DETAILED DESCRIPTION OF THE PREFERRED EMBODIMENT(S)

Figure 1:
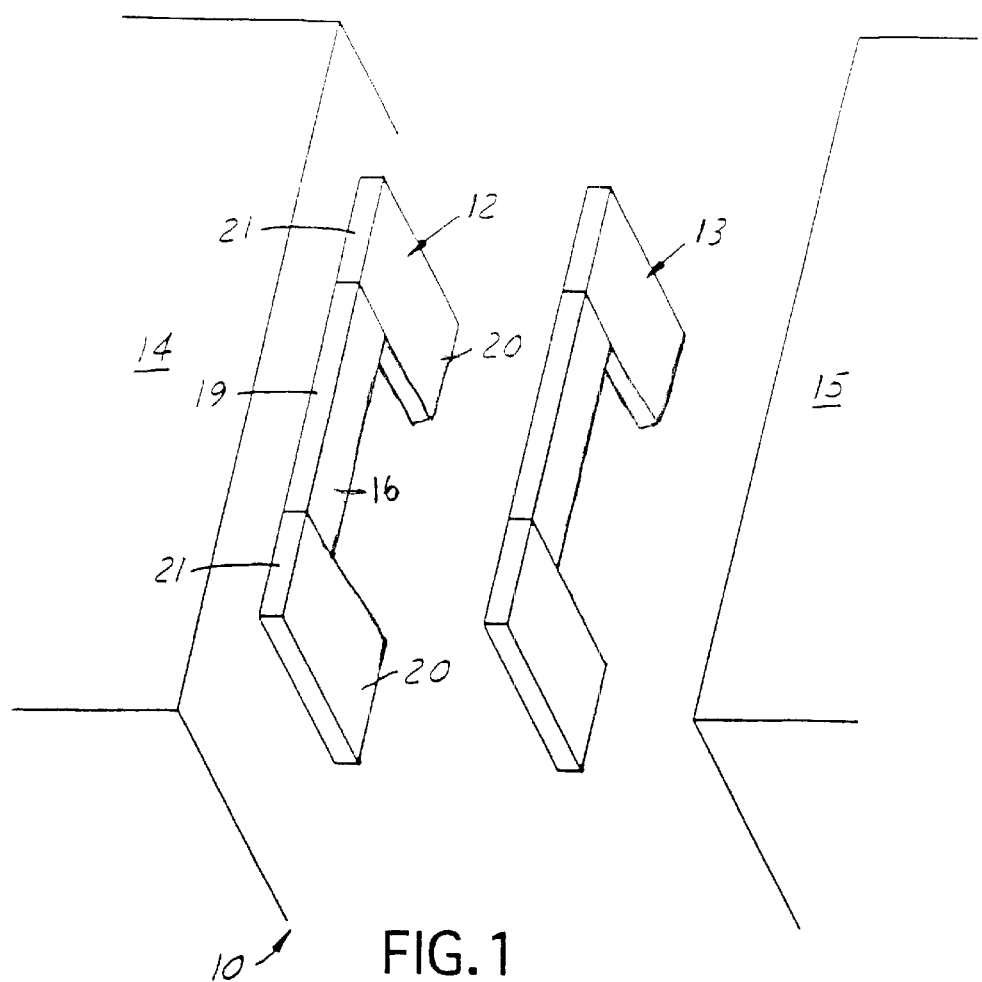
FIG. 1 illustrates a dual-stripe magneto-resistive (MR) read head in accordance with the present invention.

Referring now to FIG. 1, a dual-stripe MR magnetic read head 10 in accordance with the present invention is shown. Read head 10 includes first and second MR stripe elements 12 and 13. MR stripe elements 12 and 13 are separated by one another by an insulation layer (not shown). Magnetic shield elements 14 and 15 magnetically shield MR stripe elements 12 and 13.

Figure 2:
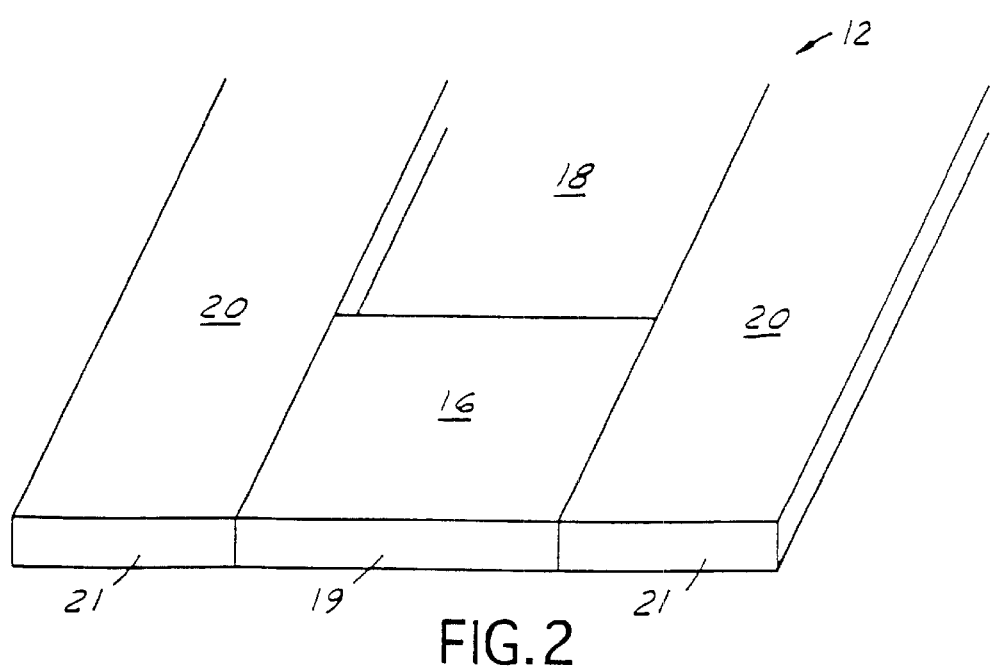
FIG. 2 illustrates a view of an MR stripe element of the MR read head shown in FIG. 1 as seen from the interface between the MR read head and a magnetic storage medium.

MR stripe elements 12 and 13 include identical structure so only MR stripe element 12 will be described in further detail. Referring now to FIG. 2, with continual reference to FIG. 1, MR stripe element 12 includes a magnetically active body portion 16. Preferably, body portion 16 is an alloy composed of Ni—Fe with a composition mixture ratio of 4:1 Ni—Fe. Ni—Fe body portion 16 is in the shape of two rectangular portions separated by a non-magnetic area 18 as shown in FIG. 1. Top surface 19 of one of the rectangular Ni—Fe portions is positioned at the interface between read head 10 and a magnetic storage medium (not shown).

MR stripe element 12 further includes an electrical conductor structure 20 formed on each side of Ni—Fe body portion 16. Surfaces 21 of electrical conductor structures 20 are positioned at the read head and magnetic storage media interface.

Figure 3:
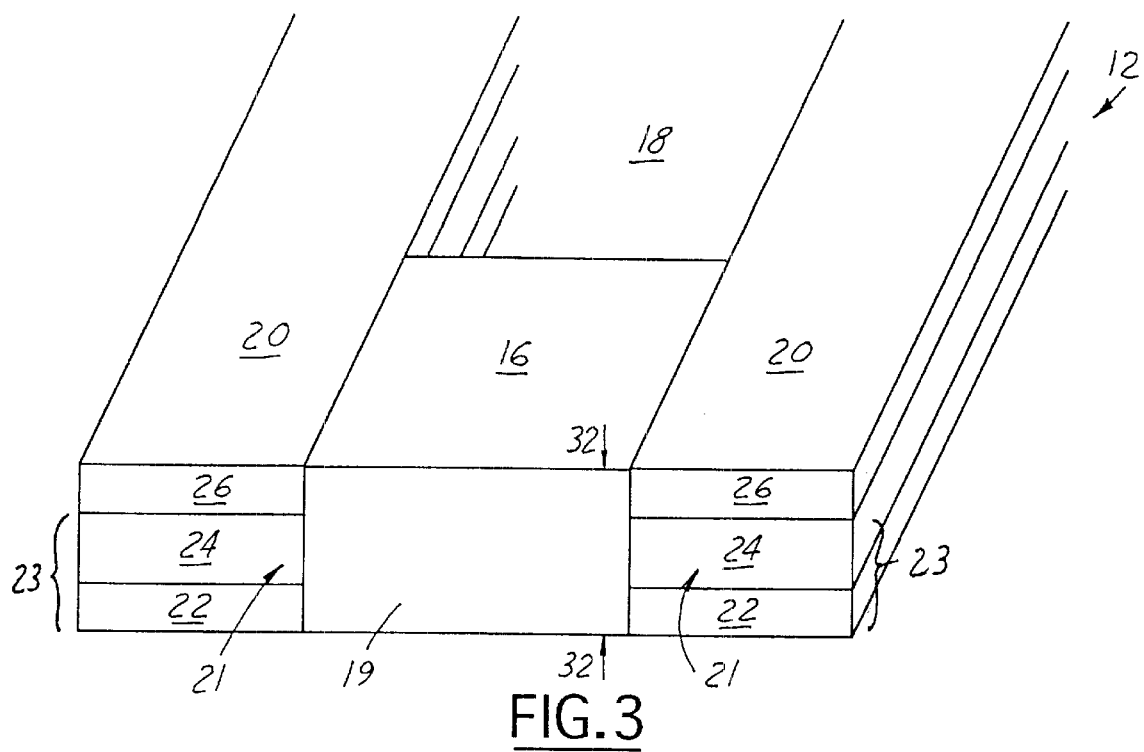
FIG. 3 illustrates a more detailed view of the MR stripe element shown in FIG. 2 as seen from the interface between the MR read head and a magnetic storage medium.

Referring now to FIG. 3, with continual reference to FIGS. 1 and 2, a more detailed view of MR stripe element 12 as seen from the interface between read head 10 and a magnetic storage medium is shown. As shown in FIG. 3, electrical conductor structures 20 are each composed of three film layers. Specifically, each electrical conductor structure 20 includes an alpha-Ta bi-layer thin film 23 having a chromium (Cr) base layer 22 (Cr under layer) and a tantalum (Ta) body layer 24. A Cr capping layer 26 is deposited over Ta body layer to cap alpha-Ta bi-layer thin film 23.

As shown in FIGS. 1, 2, and 3, Ni—Fe body portion 16 and electrical conductor structures 20 have the same thickness (denoted by arrows 32 in FIG. 3). This is intended for illustration purposes only. The thicknesses of Ni—Fe body portion 16 and electrical conductor structures 20 may be different and probably will be different in practice.

During fabrication of MR stripe element 12, Cr base layer 22 is initially deposited. Subsequently, Ta body layer 24 is deposited on Cr base layer. Finally, Cr capping layer 26 is deposited over Ta body layer 24. Preferably, each deposition step is performed by ion beam deposition. Generally, an advantage of ion beam deposition is the low pressure directionality control that results in improved photo-resist liftoff capability when defining device structures. However, other deposition techniques such as sputter deposition may be used.

As described above, alpha-Ta bi-layer 23 (composed of Cr base layer 22 and Ta body layer 24) has a high compressive stress after deposition of the Cr base layer and the Ta body layer and, as a result, the alpha-Ta bi-layer may not properly adhere to the rest of the film stack of an MR stripe element. Particularly, alpha-Ta bi-layer 23 has a relatively high negative stress value.

Cr capping layer 26 is highly tensile and, consequently, provides a positive stress value. Thus, by depositing Cr capping layer 26 on Ta body layer 24 of alpha-Ta bi-layer 23, the net effect is that the compressive stress decreases from a high negative value to a relatively lower negative value after deposition of the Cr capping layer. That is, the positive stress value of Cr capping layer 26 compensates for the relatively high negative stress value of alpha-Ta bi-layer 23.

The net effect is that electrical conductor structure 20 (i.e., alpha-Ta bi-layer 23 and Cr capping layer 26) has a compressive stress value which is lower than the compressive stress value of alpha-Ta bi-layer 23 after deposition. Specifically, electrical conductor structure 20 has a compressive stress value which is roughly 30% lower than the compressive stress value of alpha-Ta bi-layer 23 after deposition. As a result, electrical conductor structure 20 has a much better chance of properly adhering to the rest of the film stack of an MR stripe element.

Furthermore, as described above, the compressive stress of alpha-Ta bi-layer 23 without Cr capping layer 26 increases (about 20%) when exposed to annealing (typical annealing temperature range 200–300° C.). Annealing simulates the further processing steps that an MR stripe element may experience during fabrication. Thus, the compressive stress of alpha-Ta bi-layer 23 (without Cr capping layer 26) after annealing is even a higher negative value than the negative value after deposition. This raises even more concerns as to whether alpha-Ta bi-layer 23 by itself would be able to adhere to the rest of the film stack of an MR stripe element.

However, by depositing Cr capping layer 26 on alpha-Ta bi-layer 23 the compressive stress of electrical conductor structure 20 deceases by nearly an order of magnitude after annealing. Thus, the compressive stress of electrical conductor structure 20 after annealing is much lower than the compressive stress of the electrical conductor structure after deposition and is even further lower than the compressive stress of alpha-Ta bi-layer 23 after annealing. As a result, electrical conductor structure 20 will properly adhere to the rest of the film stack of an MR stripe element during further fabrication steps of the MR stripe element. Cr capping layer 26 also has the added benefit of protecting the top surface of alpha-Ta bi-layer 23 during subsequent processing.

In addition to using Cr as capping layer 26, other refractory metals such as titanium (Ti) and tungsten (W) may be used as the capping layer. Along with selecting a suitable material for capping layer 26, the thickness of the capping layer may be selected to form electrical conductor structure 20 having a minimized compressive stress. As an example, Cr base layer 22 of alpha-Ta bi-layer 23 has a thickness of 50 angstroms and Ta body layer 24 of the alpha-Ta bi-layer has a thickness of 500 angstroms. Accordingly, Cr cap layer 26 is selected to have a thickness of 50 angstroms in order to form electrical conductor structure 20 with a minimized compressive stress.

In general, compressive stress balancing is performed on alpha-Ta bi-layer 23 by adding capping layer 26 having a strategically selected electrical conductive constituent. The compressive stress balancing may also dictate the thickness range appropriate for capping layer 26.

Figure 4:
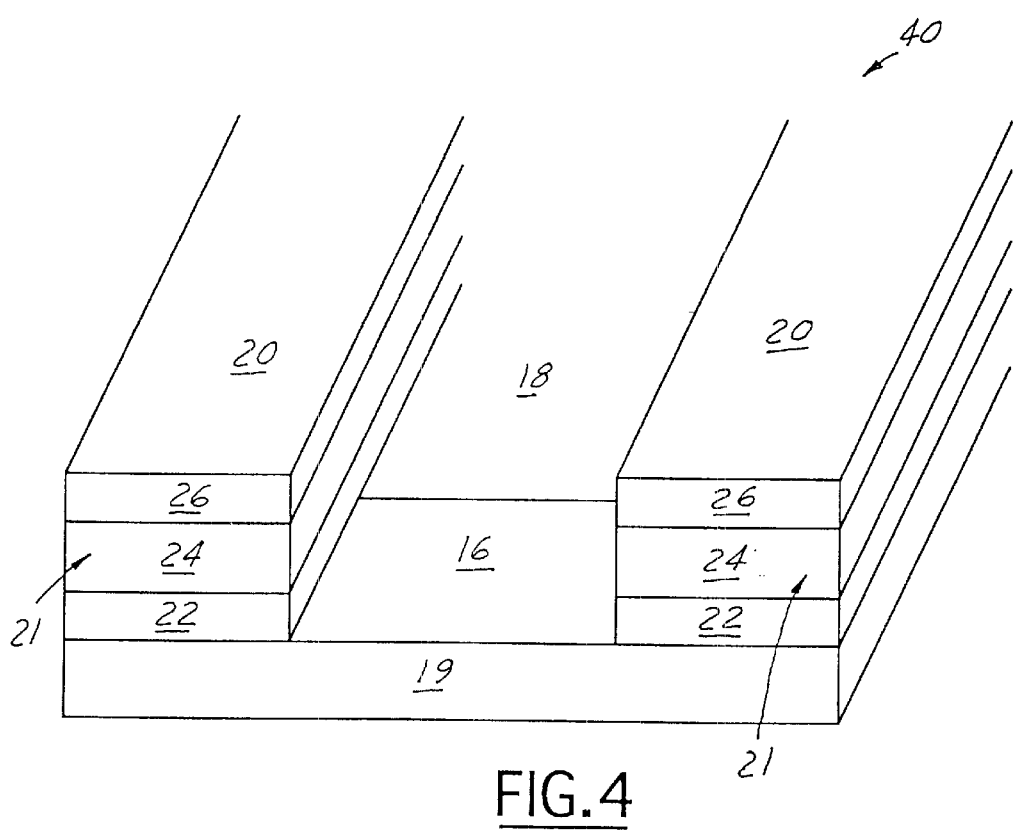
FIG. 4 illustrates a view of an alternative MR stripe element of an MR read head as seen from the interface between the MR read head and a magnetic storage medium.

Referring now to FIG. 4, with continual reference to FIG. 3, a view of an alternative MR stripe element 40 of an MR read head as seen from the interface between the MR read head and a magnetic storage medium is shown. MR stripe element 40 generally differs from MR stripe element 12 in that electrical conductor structures 20 (composed of alpha-Ta film layer 23 and Cr capping layer 26) are deposited on arm portions of Ni—Fe body portion 16. This has the effect of a relatively greater area of surface 19 of Ni—Fe body portion 16 being present at the interface between the MR read head and the magnetic storage medium.

Thus it is apparent that there has been provided, in accordance with the present invention, an MR stripe element having a thin film electrical conductor covered by an electrically conductive capping layer in order to form a combined structure having a minimized compressive stress that fully satisfies the objects, aims, and advantages set forth above.

While the present invention has been described in conjunction with specific embodiments thereof, it is evident that many alternatives, modifications, and variations will be apparent to those skilled in the art in light of the foregoing description. For instance, in addition to magnetic heads having MR dual-stripe elements, the present invention is applicable to magnetic heads having a single MR stripe element. Furthermore, the present invention is applicable to giant MR stripe elements. Accordingly, the present invention is intended to embrace all such alternatives, modifications, and variations as fall within the spirit and broad scope of the appended claims.

What is claimed is:

1. A magneto-resistive stripe element comprising:

a magnetically active body portion; and an electrical conductor structure arranged proximate the magnetically active body portion, the electrical conductor structure having an alpha-Ta bi-layer film and an electrically conductive chromium capping layer, wherein the alpha-Ta bi-layer film includes a chromium base layer and a tantalum body layer, wherein the electrically conductive chromium capping layer caps the alpha-Ta bi-layer film such that the tantalum body layer is disposed between the chromium base layer and the electrically conductive chromium capping layer and is in direct contact with the chromium base layer and the electrically conductive chromium capping layer.

2. A magneto-resistive stripe element comprising:

a magnetically active body portion; and an electrical conductor structure arranged proximate the magnetically active body portion, the electrical conductor structure having an alpha-Ta bi-layer film and an electrically conductive titanium capping layer, wherein the alpha-Ta bi-layer film includes a chromium base layer and a tantalum body layer, wherein the electrically conductive titanium capping layer caps the alpha-Ta bi-layer film such that the tantalum body layer is disposed between the chromium base layer and the electrically conductive titanium capping layer and is in direct contact with the chromium base layer and the electrically conductive titanium capping layer.

3. A magneto-resistive stripe element comprising:

a magnetically active body portion; and an electrical conductor structure arranged proximate the magnetically active body portion, the electrical conductor structure having an alpha-Ta bi-layer film and an electrically conductive tungsten capping layer, wherein the alpha-Ta bi-layer film includes a chromium base layer and a tantalum body layer, wherein the electrically conductive tungsten capping layer caps the alpha-Ta bi-layer film such that the tantalum body layer is disposed between the chromium base layer and the electrically conductive tungsten capping layer and is in direct contact with the chromium base layer and the electrically conductive tungsten capping layer.

4. The element of claim 1 wherein:

the magnetically active body portion is an alloy of nickel and iron.

5. The element of claim 1 wherein:

the electrical conductor structure includes two electrical conductor structures arranged proximate to opposite sides of the magnetically active body portion.

6. The element of claim 1 wherein:

the magnetically active body portion includes a surface for meeting a storage medium along a storage medium interface plane, and the electrical conductor structure includes a surface for meeting the storage medium at the storage medium interface plane.

7. The element of claim 1 wherein:

the chromium base layer has a thickness, wherein the electrically conductive chromium capping layer has a thickness dependent upon at least the thickness of the chromium base layer.

8. A magnetic head for reading data from a magnetic storage medium, the head comprising:

a magneto-resistive stripe element having a magnetically active body portion and electrical conductor structure arranged proximate the magnetically active body portion, wherein the electrical conductor structure includes an alpha-Ta bi-layer film and an electrically conductive chromium capping layer, wherein the alpha-Ta bi-layer film includes a chromium base layer and a tantalum body layer, wherein the electrically conductive chromium capping layer caps the alpha-Ta bi-layer film such that the tantalum body layer is disposed between the chromium base layer and the electrically conductive chromium capping layer and is in direct contact with the chromium base layer and the electrically conductive chromium capping layer.

9. The head of claim 8 wherein:

the electrical conductor structure includes two electrical conductor structures arranged proximate to opposite sides of the magnetically active body portion.

10. A magneto-resistive stripe element comprising:

a magnetically active body portion; and an electrical conductor structure arranged proximate the magnetically active body portion, the electrical conductor structure having an alpha-Ta bi-layer film body capped by an electrically conductive chromium capping layer such that the tantalum body layer is disposed between the chromium base layer and the electrically conductive chromium capping layer and is in direct contact with the chromium base layer and the electrically conductive chromium capping layer, wherein the electrically conductive chromium capping layer has a lower compressive stress than the alpha-Ta bi-layer film body such that the electrical conductor structure has a lower compressive stress than the compressive stress of the alpha-Ta bi-layer film body.

11. The element of claim 10 wherein:

the magnetically active body portion includes a surface for meeting a storage medium along a storage medium interface plane, and the electrical conductor structure includes a surface for meeting the storage medium at the storage medium interface plane.

12. The element of claim 10 wherein:

the alpha-Ta bi-layer film body has a thickness, wherein the electrically conductive chromium capping layer has a thickness dependent upon the thickness of the alpha-Ta bi-layer film body such that the electrical conductor structure has a lower compressive stress than the compressive stress of the alpha-Ta bi-layer film body.

13. A magnetic head comprising:

a magneto-resistive stripe element having a magnetically active body portion and an electrical conductor structure arranged proximate the magnetically active body portion, the electrical conductor structure having an alpha-Ta bi-layer film and an electrically conductive chromium capping layer, wherein the alpha-Ta bi-layer film includes a chromium base layer and a tantalum body layer, wherein the electrically conductive chromium capping layer caps the alpha-Ta bi-layer film such that the tantalum body layer is disposed between the chromium base layer and the electrically conductive chromium capping layer and is in direct contact with the chromium base layer and the electrically conductive chromium capping layer.

* * * * *